March 18, 1952

E. N. BURNETT 2,589,601

MAGNETIC SLATE

Filed Sept. 26, 1950

INVENTOR.
Edward N. Burnett

BY

Townsend and Townsend

Attorneys

Patented Mar. 18, 1952

2,589,601

UNITED STATES PATENT OFFICE 2,589,601

MAGNETIC SLATE

Edward N. Burnett, San Lorenzo, Calif.

Application September 26, 1950, Serial No. 186,861

3 Claims. (Cl. 35—66)

This invention relates to new and useful improvements in magnetic slates. More particularly, the invention relates to a slate upon which erasable symbols may be made by use of a magnet.

The invention is particularly useful as a novelty or toy in that it does not require the use of chalk, crayon, or pencil, which implements children frequently misuse to mark walls, furniture, woodwork, etc. about the home. Further, the magnet used with the slate as well as the slate itself are entirely safe and do not contain any sharp points or corners, are sanitary, and cannot readily be swallowed by an infant.

The device has desirable features in that the use of the slate teaches scientific principles of magnetism and is highly entertaining in that such principles are outside the general experience of children. Additionally, it has all of the entertainment features of conventional slates used with chalk.

Other objects of the present invention will become apparent upon reading the following specification and referring to the accompanying drawings in which similar characters of reference represent corresponding parts in each of the several views.

Figure 1:
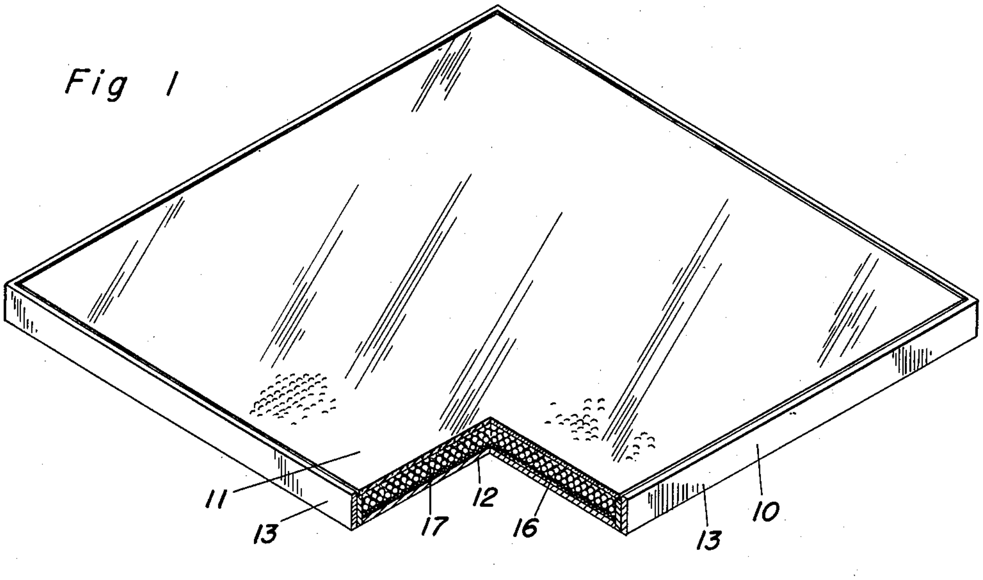
Fig. 1 is a perspective of the slate which is the subject of the invention, the same being partially broken away in section.
Figure 2:
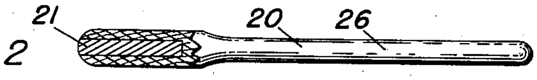
Fig. 2 is a perspective of a magnetic pencil, partially broken away in section.

The instant invention comprises a slate 10 which may be of any desired shape, but as shown in the accompanying drawings is square. It will be understood that a rectangular, round, oval, or other shape might be employed. The top surface 11 of the slate is a transparent sheet of plastic material, glass, or the like embedded in a frame, said frame being preferable in the shape of a shallow box having a bottom 12 and sides 13. It will be understood that the top surface 11 and the sides 13 are sealed together so that no moisture may enter and the pellets inside the box cannot escape therefrom. The transparent top 11 is spaced from the bottom 12. Bottom 12, sides 13 and top 11 are all formed of non-magnetic material, preferable molded plastic. Within the box is a plurality of small pellets 16 of magnetic material such as steel shot. Sufficient pellets 16 are placed in the box so that when the box is level a layer of pellets 16 completely covers the bottom 12. Overlying the magnetic pellets 16 is a layer of non-magnetic pellets or circular disks 17. Non-magnetic elements 17 which may be, for example, pearl barley are of a diameter larger, and of a density less, than the magnetic pellets 16 on the bottom of the box. Spherical or flat disc plastic pellets may be employed.

When the box is gently shaken, the heavier magnetic pellets 16 are covered by the non-magnetic pellets 17, there thus being two contiguous layers of the same dimensions as the bottom 12. The magnetic pellets 16 are preferable of a color contrasting with the color of the non-magnetic pellets 17. For example, the magnetic pellets 16 may be black and the non-magnetic pellets 17 may be white. When observed through the transparent cover 11 before any markings are made, the entire bottom of the box appears to be white.

Figure 3:
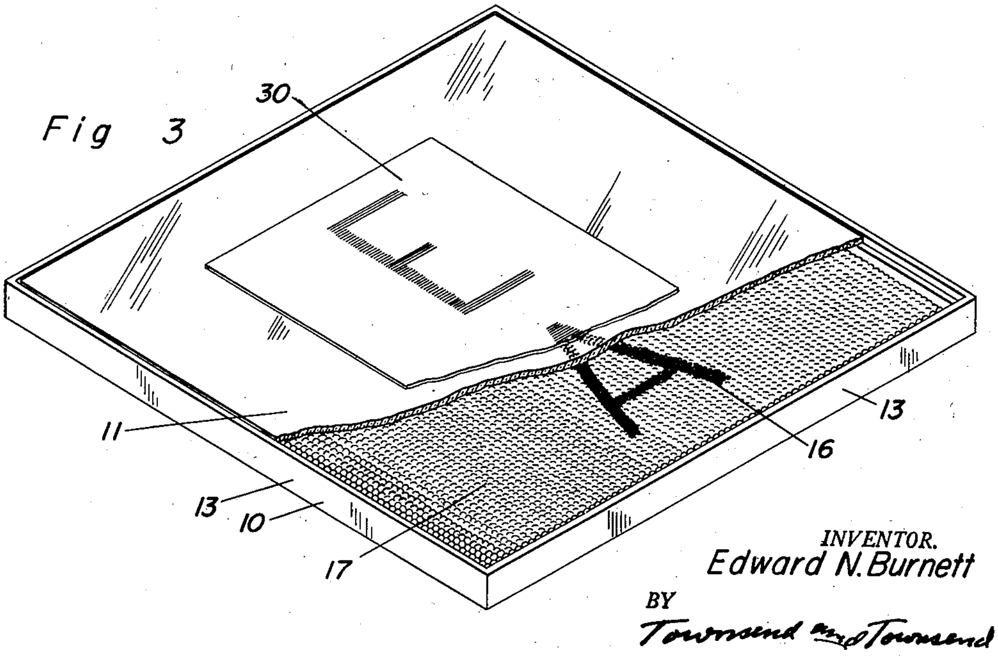
Fig. 3 is a view similar to Fig. 1 illustrating the formation of symbols by reason of magnetic pellets being raised above contrasting non-magnetic pellets.

In order to mark the slate, a magnetic pencil 20 is used, said pencil comprising a bar magnet 21 embedded in one end of non-magnetic handle 22 so that one pole of the bar magnet 21 is exposed at one end of pencil 20. The user draws the magnet 21 over the transparent top 11 of the slate 10, thereby attracting the magnetic pellets 16 immediately below so that the path of pencil 20 is marked by reason of pellets 16 being raised up above the level of the layer of non-magnetic pellets 17. Because of the contrasting color of pellets 16 and 17 marks corresponding to the movement of the magnet over the surface of the slate appear through transparent top 11. See Fig. 3.

When it is desired to erase the markings, slate 10 is held level and gently shaken, thus causing all the non-magnetic pellets 17 to rise above the surface of the magnetic pellets 16.

It will be understood that a stencil 30 (see Fig. 3) may be placed over transparent top 11 and the pencil 20 used to trace the markings on said stencil. The magnetic pellets 16 will be drawn upward to reproduce said markings of stencil 30. Preferably stencil 30 is dimensioned to fit top 11.

The depth of sides 13, weight of pellets 16 and strength of magnet 21 are selected such that the path of magnet 21 is accurately traced. For example, it has been found satisfactory to employ steel shot pellets 16 approximately $\frac{1}{16}$ inch in diameter, pearl barley pellets 17 approximately $\frac{1}{8}$ inch in diameter or flat plastic discs $\frac{3}{32}$ inch to $\frac{1}{8}$ inch in diameter, sides $\frac{7}{8}$ inch deep, and a common bar magnet 21 of a diameter of $\frac{3}{8}$ inch and length of 2 inches. Clearance between the underside of top 11 and the top of layer of pellets 17 is preferably about ¼ inch.

Although the present invention has been described in some detail by way of illustration and example for purposes of clarity of understanding, it is understood that certain changes and modifications may be made within the spirit of the invention and scope of the claims appended hereto.

I claim:

1. A magnetic slate comprising a shallow, flat-bottomed, non-magnetic box, a flat surfaced, non-magnetic, transparent cover for said box, a plurality of small, dense, magnetic particles sufficient in number substantially to cover the bottom of said box in a single layer, and a plurality of light, non-magnetic particles of a color contrasting with said magnetic particles sufficient in number substantially to cover in a single layer said layer of magnetic particles.

2. In combination a slate as defined in claim 1 and a magnetic pencil, said pencil including a magnet.

3. In combination a slate as defined in claim 1 and a magnetic pencil, said pencil including a magnet, and a non-magnetic handle in which said magnet is embedded.

EDWARD N. BURNETT.

REFERENCES CITED

The following references are of record in the file of this patent:

UNITED STATES PATENTS

| Number | Name | Date |
|---|---|---|
| 74,815 | Funston | Feb. 25, 1868 |
| 417,931 | Miatt | Dec. 24, 1889 |
| 611,545 | Yarnall | Sept. 27, 1898 |
| 1,074,533 | Schowalter | Sept. 30, 1913 |
| 1,549,197 | Hanback | Aug. 11, 1925 |
| 1,595,801 | McDonald | Aug. 10, 1926 |
| 2,408,141 | Heil | Sept. 24, 1946 |
| 2,530,013 | Hanback | Nov. 15, 1950 |